US006850628B2

(12) United States Patent
Shirato (10) Patent No.: US 6,850,628 B2
(45) Date of Patent: Feb. 1, 2005

(54) LANE RECOGNITION APPARATUS FOR VEHICLE

(75) Inventor: Ryota Shirato, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 652 days.

(21) Appl. No.: 09/982,956

(22) Filed: Oct. 22, 2001

(65) Prior Publication Data

US 2002/0131620 A1 Sep. 19, 2002

(30) Foreign Application Priority Data

Dec. 27, 2000 (JP) ........................................ 2000-397747

(51) Int. Cl.⁷ ............................. G06K 9/00; B60Q 1/00
(52) U.S. Cl. ........................................ 382/104; 701/28
(58) Field of Search ............................ 382/104; 701/23, 701/28, 300; 348/113, 118; 340/988

(56) References Cited

U.S. PATENT DOCUMENTS

| | | | | |
|---|---|---|---|---|
| 5,991,427 A | * | 11/1999 | Kakinami et al. | 382/104 |
| 6,133,824 A | * | 10/2000 | Lee et al. | 340/435 |
| 6,434,256 B1 | * | 8/2002 | Yeo | 382/104 |
| 6,449,383 B1 | * | 9/2002 | Oike et al. | 382/104 |
| 2002/0042668 A1 | * | 4/2002 | Shirato et al. | 701/1 |

FOREIGN PATENT DOCUMENTS

JP 11-259639 A 9/1999 ............ G06T/1/00

OTHER PUBLICATIONS

A. Takahashi et al., "A Method for robust Lane Marking Candidate Selection of Lane Recognition," *Systems and Computers in Japan*, vol. 31, No. 3, 2000, pp. 11–18.
R. Risack et al., "Robust lane recognition embedded in a real–time driver assistance system," *1998 IEEE International Conference on Intelligent Vehicles*, 1998, pp. 35–40.
Chiu–Fend Lin et al., "Lane Geometry Perception and the Characterization of its Associated Uncertainty," *Journal of Dynamic Systems, Measurement and Control*, vol. 121, No. 1, Mar. 1999, pp. 1–9.
H. Sahli et al., "Road Identification and Following Using Colour," 1997, Croydon, UK, Automotive Autorn, UK, 1997, pp. 179–186.

* cited by examiner

*Primary Examiner*—Andrew W. Johns
(74) *Attorney, Agent, or Firm*—Foley & Lardner LLP (57) ABSTRACT

A lane recognition apparatus for a vehicle is comprised of a camera and a processor. The camera is installed to the vehicle and picks up a road image ahead of the vehicle. The processor is coupled to the camera. The processor is arranged to detect a plurality of lane marker candidate points from the road image, to calculate a road model parameter representative of a road shape ahead of the vehicle on the basis of the lane marker candidate points, to calculate a deviation between the lane marker candidate point and an estimated candidate point estimated from the road model parameter, and to determine whether the road image is employed for detecting the lane marker, on the basis of the deviation.

12 Claims, 9 Drawing Sheets

LANE RECOGNITION APPARATUS FOR VEHICLE

BACKGROUND OF THE INVENTION

The present invention relates to an apparatus for recognizing a lane on which a vehicle or other mover travels.

Various lane recognition apparatuses have been proposed in order to assist a driver to drive a vehicle along a lane or to automatically drive a vehicle. Japanese Patent Provisional Publication No. 11-259639 discloses a lane recognition apparatus which is capable of determining whether each of the detected lane marker candidate point may be treated as a correct candidate point on the basis of the dispersion of lane marker candidate points and an estimated line.

SUMMARY OF THE INVENTION

However, such a lane recognition apparatus yet has problems to be improved in order to further accurately and stably estimate a road shape.

It is therefore an object of the present invention to provide an improved lane recognition apparatus which is capable of eliminating an erroneous recognition caused by an erroneous detection of lane marker candidate points.

An aspect of the present invention resides in a lane recognition apparatus for a vehicle, which comprises an image picking-up section picking up a road image ahead of the vehicle; a lane-marker detecting section detecting a plurality of lane-marker candidate points on the road image; a road model parameter calculating section calculating a road model parameter representative of a road shape ahead of the vehicle on the basis of the lane-marker candidate points; a deviation calculating section calculating a deviation between the lane marker candidate point and an estimated candidate point estimated from the road model parameter; and a lane marker detection feasibility determining section determining whether the road image is employed for detecting the lane marker, on the basis of the deviation.

Another aspect of the present invention resides in a method for recognizing a lane ahead of a vehicle, which method comprises a step for picking up a road image ahead of the vehicle; a step for detecting a plurality of lane marker candidate points from the road image; a step for calculating a road model parameter representative of a road shape ahead of the vehicle on the basis of the lane marker candidate points; a step for calculating a deviation between the lane marker candidate point and an estimated candidate point estimated from the road model parameter; and a step for determining whether the road image is employed for detecting the lane marker, on the basis of the detecting deviation.

Further another aspect of the present invention resides in a lane recognition apparatus for a vehicle which comprises a camera and a processor. The camera is installed to the vehicle and picks up a road image ahead of the vehicle. The processor is coupled to the camera and is arranged to detect a plurality of lane marker candidate points from the road image, to calculate a road model parameter representative of a road shape ahead of the vehicle on the basis of the lane marker candidate points, to calculate a deviation between the lane marker candidate point and an estimated candidate point estimated from the road model parameter, and to determine whether the road image is employed for detecting the lane marker, on the basis of the deviation.

The other objects and features of this invention will become understood from the following description with reference to the accompanying drawings.

DETAILED DESCRIPTION OF THE INVENTION

Embodiments of the invention will now be described based on the drawings.

[First Embodiment]

Figure 1:
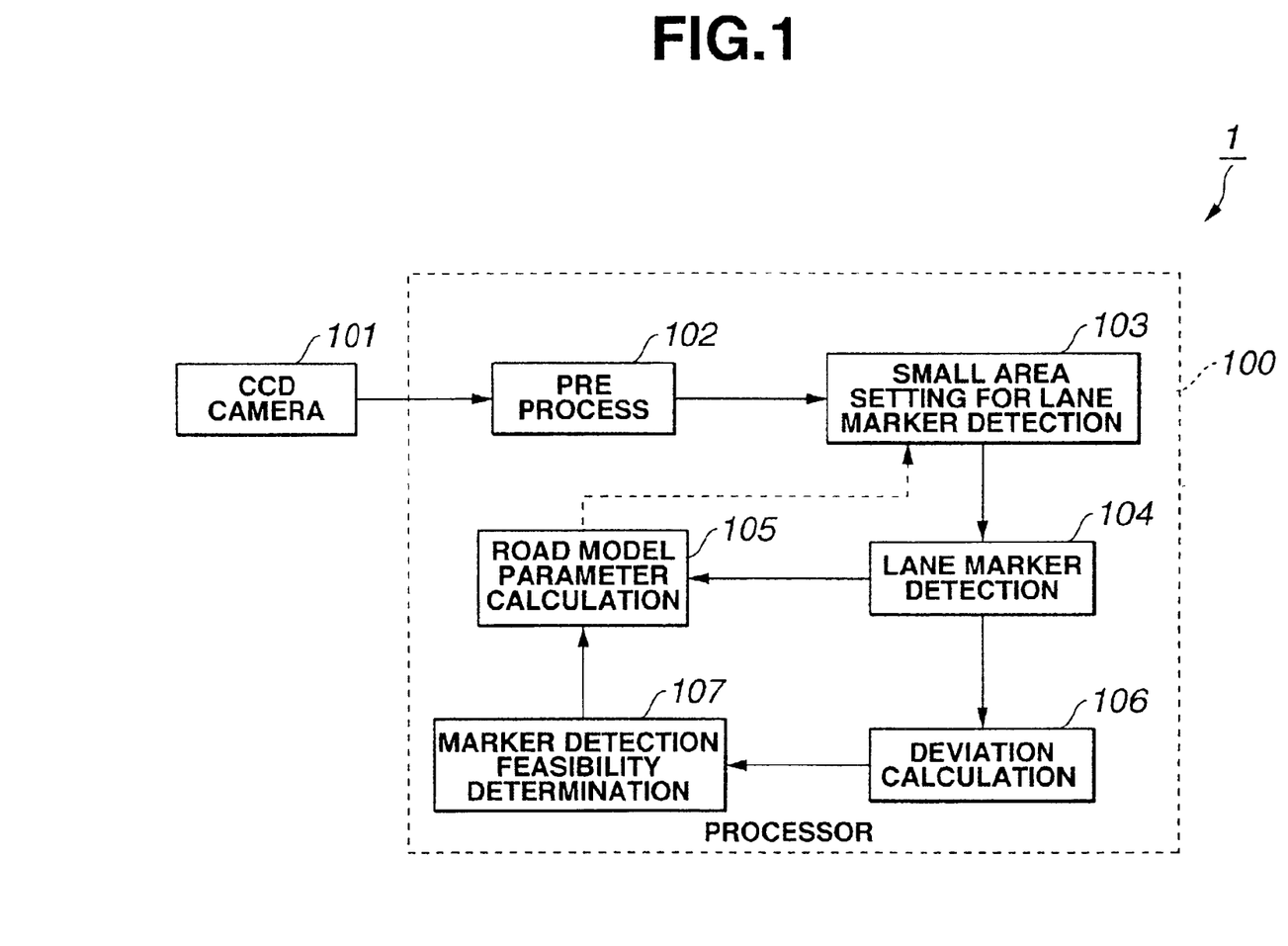
FIG. 1 is a block diagram showing a lane recognition apparatus which is common in first to third embodiments according to the present invention.

FIG. 1 is a block diagram showing a first embodiment of a lane recognition apparatus 1 for a vehicle according to the present invention. Lane recognition apparatus 1 comprises a CCD camera 101 for picking up an image of a scene of a road ahead of the vehicle, a pre-process section 102 for uniformly processing an entire screen of a video signal from CCD camera 101, a lane marker detection small area setting section 103 for setting a plurality of small areas for detecting a lane marker on an input screen, a lane marker detecting section 104 for detecting a part of the lane marker in each small area as a lane marker candidate point, a road parameter calculating section 105 for calculating road parameters for representing the shape of the road ahead of the vehicle based on the result of lane marker detection executed at lane marker detecting section 104, a deviation calculating section 106 for calculating a deviation between the lane marker candidate point and the estimated candidate point estimated from the road model parameter, and a marker detection feasibility determining section 107 for determining whether or not the lane maker can be detected from the image on the basis of deviation calculating section 106. CCD camera 101 functions as an image pickup section of the invention.

The lane recognition apparatus 1 comprises a processor 100 which is constituted by a microcomputer and which is coupled to CCD camera 101. The microcomputer is arranged to store the sections 101 through 107 of the lane recognition apparatus in the form of software and to perform the processes of the sections 101 through 107 by executing a program control in processor 100.

Now, there will be described steps for recognizing a lane executed by lane recognition apparatus 1 according to the present invention.

Figure 2:
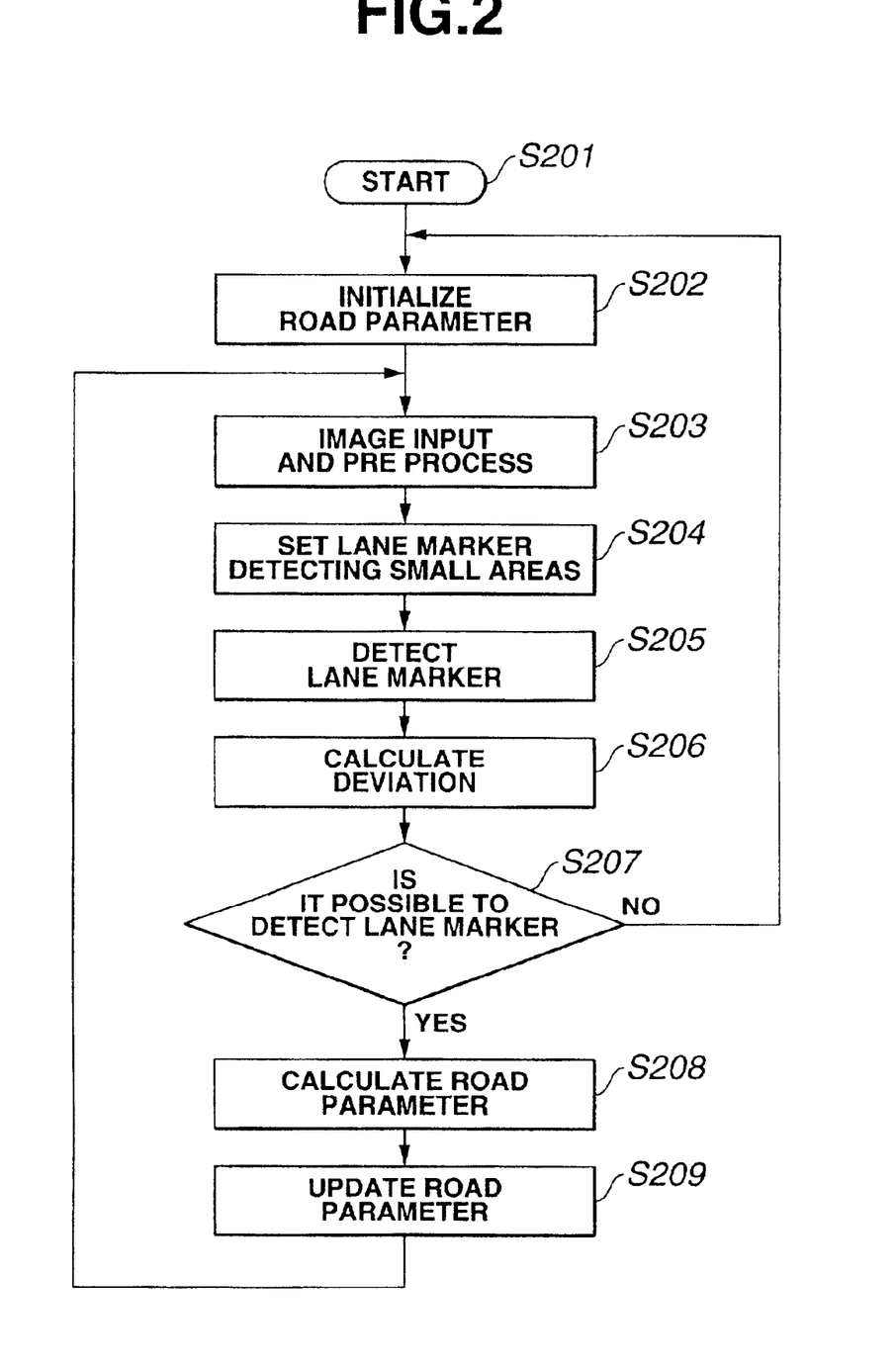
FIG. 2 is a flowchart showing a processing procedure of the lane recognition apparatus of the first embodiment.

FIG. 2 is a flowchart showing a flow of processes in the first embodiment according to the present invention. First, lane recognition apparatus 1 is started when a switch is operated by the driver or the vehicle is ignited at step S201. At step S202 road parameters for recognizing the shape of a road ahead of the vehicle are initialized.

Figure 5:
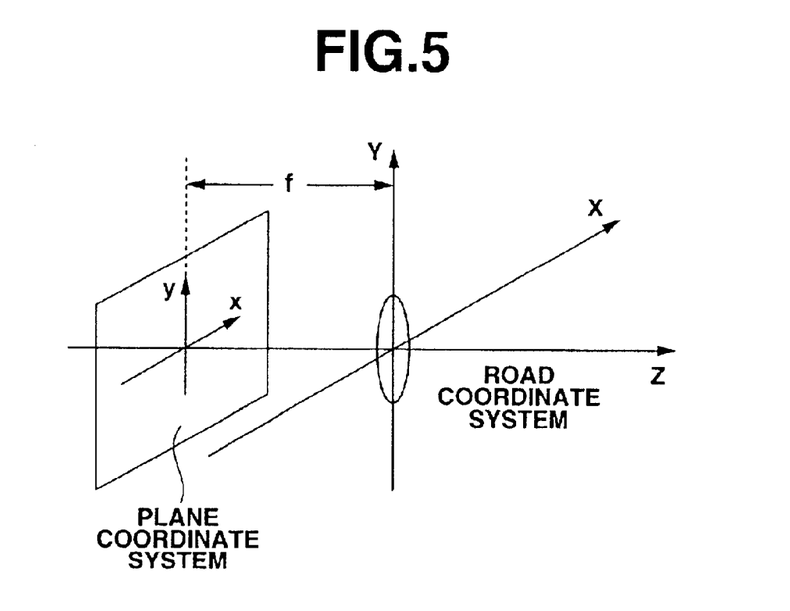
FIG. 5 is a view showing a relationship between a road coordinate system and a plane coordinate system employed in the present invention.

The road parameters are defined according to the following procedure. As shown in FIG. 5, a road coordinate system is defined as an XYZ system in which the center of an image pickup lens of CCD camera 101 is the origin. The X-axis extends from the right to the left as viewed in the traveling direction of the vehicle. The Y-axis extends upward in the direction of the height of the vehicle. The Z-axis is the optical axis of the lens along the traveling direction of the vehicle. As shown in FIG. 5, a plane coordinate system of an image processing screen is defined in which the origin is at the upper left corner of the screen. The x-axis horizontally extends, and the y-axis vertically extends from the top to the bottom in accordance with the direction in which a screen is scanned in television communication systems such as NTSC.

The relationship between those two coordinate systems is as shown in FIG. 5 and, for simplicity, coordinate transformation from the road coordinate system to the plane coordinate system is expressed by Equations (1) and (2) shown below where the origin of the plane coordinate system is located on the Z-axis of the road coordinate system as shown in FIG. 5.

$$x = -fX/Z \tag{1}$$

$$y = -fY/Z \tag{2}$$

where f represents a parameter that represents the focal length of the lens.

Figure 6A:
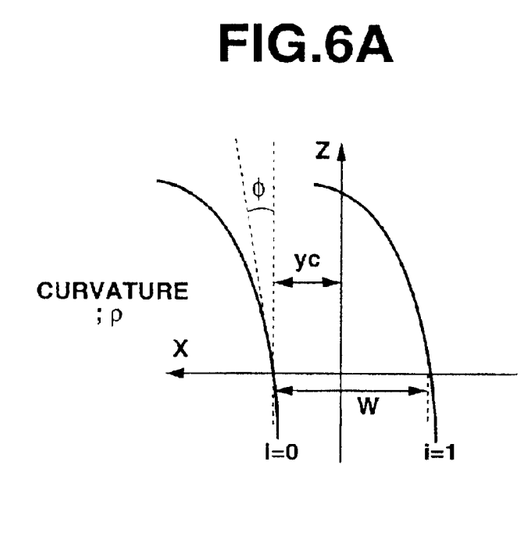
FIGS. 6A and 6B are views showing a road model according to the present invention.
Figure 6B:
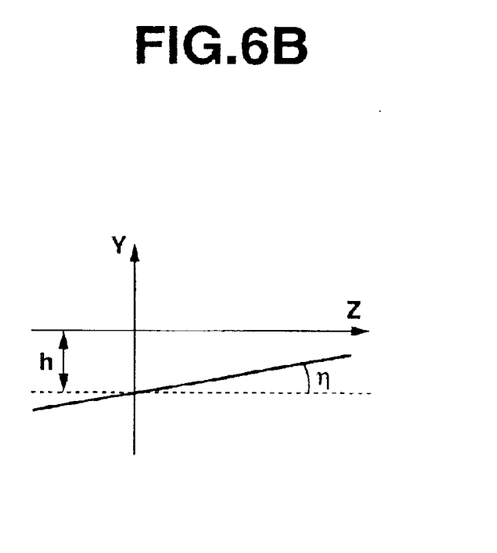

While a planar structure of a road is defined by straight lines, curves having constant curvatures, and clothoid curves having constant curvature change rates for connecting the straight line and the curve, a section of the road of several tens meters ahead of a vehicle can be regarded as a curved road having a constant curvature or a straight road. Then, the shape of a lane marker was formulated as shown in FIG. 6A. Similarly, a longitudinal structure of the same was formulated as shown in FIG. 6B because it can be regarded as having a constant gradient. The formulae are respectively given as Equations (3) and (4) below.

$$X = \frac{\rho}{2}Z^2 + \phi Z + y_c - iW \tag{3}$$

$$Y = \eta Z - h \tag{4}$$

where $\rho$ represents the curvature of the road; $\phi$ represents a yaw angle of the vehicle to the road; $y_c$ represents lateral displacement of the vehicle from a left lane marker; W represents the vehicle width; i represents the left line marker when it is 0 and represents a right lane marker when it is 1; $\eta$ represents a pitch angle of the optical axis of the lens to the road surface; and h represents the height of the camera above the ground.

The shape of a lane marker projected on the plane coordinate system of the image processing screen can be formulated from Equations (1) through (4). Equations (1) through (4) can be rearranged by eliminating X, Y, and Z to obtain the following Equations (5) through (10).

$$x = (a + ie)(y - d) - \frac{b}{y - d} + c \tag{5}$$

where $$a = -y_c/h, \tag{6}$$

$$b = -f^2 h\rho/h, \tag{7}$$

$$c = -f\phi + c_0, \tag{8}$$

$$d = -f\eta + d_0, \text{ and} \tag{9}$$

$$e = W/h. \tag{10}$$

The terms $c_0$ and $d_0$ are correction values that are required because the actual origin is located at the upper left corner of the image processing screen in spite of the fact that the origin of the plane coordinate system is on the Z-axis in the road coordinate system in FIG. 5.

It is apparent from the above that the curvature of the road, the pitch angle and the yaw angle of the vehicle, and the lateral displacement of the vehicle within the lane can be estimated by identifying values of parameters a through e in Equation (5) which are satisfied by a lane marker candidate point detected through the image processing.

Returning to FIG. 2, at step S203, an image signal of an image picked up by CCD camera 101 is inputted to pre-processing section 102 which performs a pre-process on the same. For example, as a pre-process for detecting a lane marker, primary space differentiation is performed with a Sobel Filter to emphasize a boundary between the lane marker and a road surface. The object of lane marker detection is such a boundary. Since a lane marker has regions which are nearly horizontal and regions which are nearly vertical depending on the curvature of the road, two edge images are created using horizontal differentiation and vertical differentiation. Other edge emphasizing filters may be used to emphasize a boundary between the lane marker and road surface. Further, any method for emphasizing the boundary may be employed for characteristically extracting the lane marker.

Figure 7:
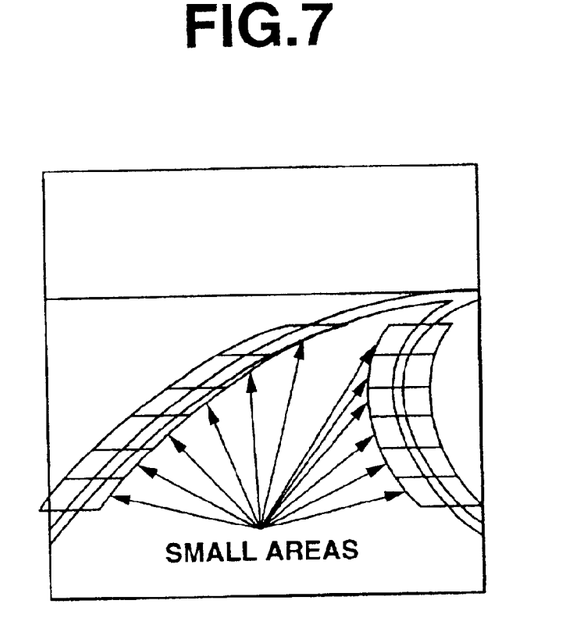
FIG. 7 is an explanatory view of lane marker detection small areas employed in the present invention.

At step S204, a plurality of small areas are set in order to detect a lane marker which indicates the lane in which the vehicle is traveling on the screen. As shown in FIG. 7, the detection areas are set as predetermined sections defined along the shape of the road identified from the results of the previous image processing or road parameters which have been initially set. Since road model parameter calculating section 105 comprises a storage device for storing the road model parameter, at this step S204 processor 100 reads the road model parameter stored in the storage device and uses in the small area setting process.

Figure 8:
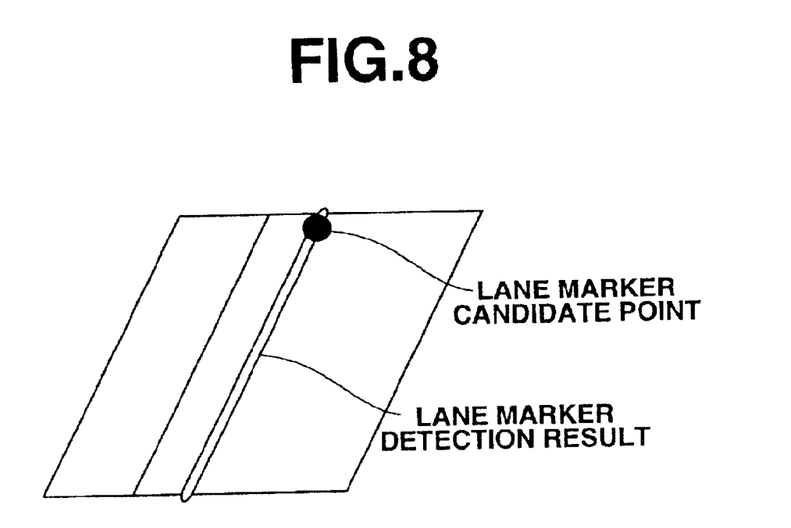
FIG. 8 is an explanatory view of a lamer marker detection result and a lane marker candidate point.

At step S205, processor 100 detects a straight line, which most likely seems to be a boundary between the lane marker and the road surface in the region in the small areas set in step S204, and defines the point on the straight line as a lane marker candidate point. As shown in FIG. 8, the upper-most point of the results of the straight line detection is defined as the lane marker candidate point. Each lane marker point is stored in the form of the coordinate value in the x-y coordinate system.

Figure 9:
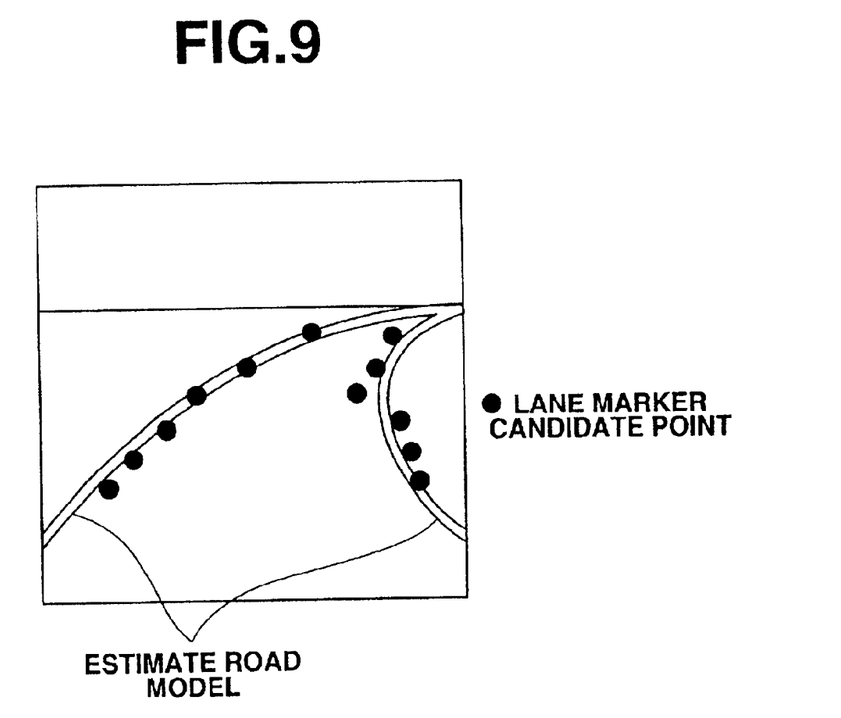
FIG. 9 is a view showing a relationship between the lane marker candidate points and an estimated road model.
Figure 10:
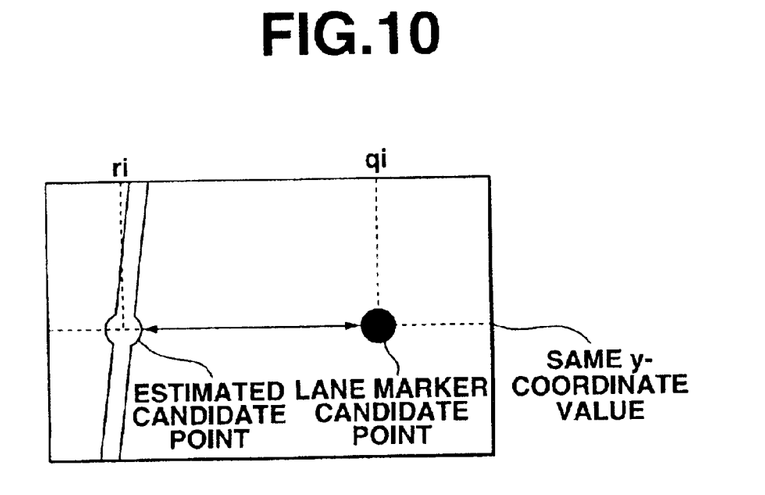
FIG. 10 is an explanatory view of a deviation between the estimated candidate point and the lane marker candidate point.

At step S206, processor 100 calculates a deviation of each lane marker candidate point detected at step S205 relative to the road model estimated from the result of the previous lane marker recognition result, as shown in FIG. 9. By defining such that a point, which is located on the road model and on the same y-coordinate of the lane marker candidate point treated as a calculated object, is an estimated candidate point and that a x-coordinate of the lane marker candidate point is qi and a x-coordinate of the estimated candidate point is ri as shown in FIG. 10, the deviation pi is obtained by Equation (11).

$$pi=|qi-ri| \qquad (11)$$

Since the deviation at each lane marker candidate point detected can be calculated by Equation (11), an average of the respective deviations pi is represented by Equation (12) and is used as a deviation p of the lane marker detection result in the present image.

$$p=(\text{total of all pi})/(\text{number of lane marker candidate points}) \qquad (12)$$

Equation (13) may be employed for the calculation of each deviation pi as follows.

$$pi=(qi-ri)^2 \qquad (13)$$

The model parameter is also read from the storage device of the road parameter calculating section 105 and used in this deviation calculating process.

Figure 11:
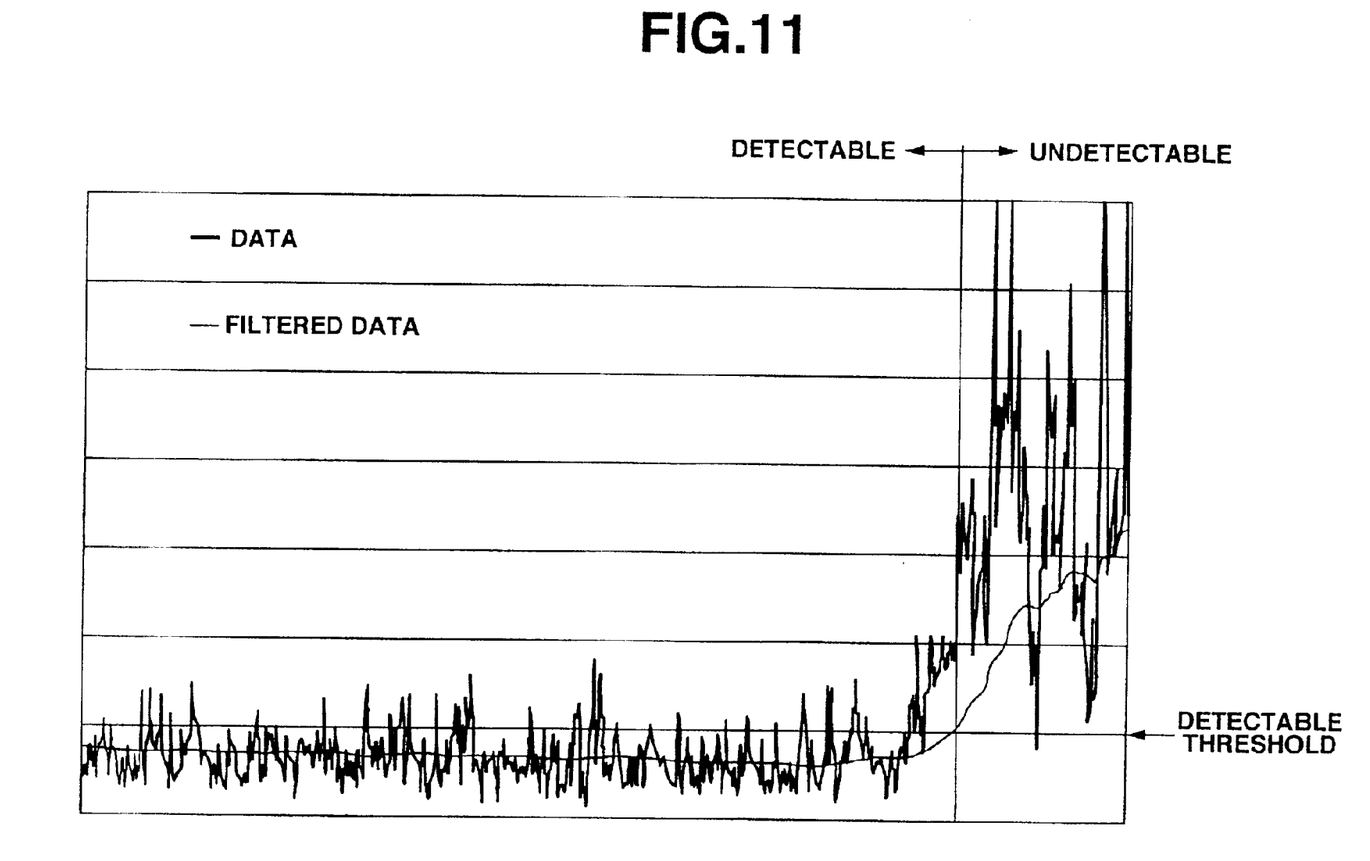
FIG. 11 is a graph showing a detectable threshold between detectable data and undetectable data.
Figure 12A:
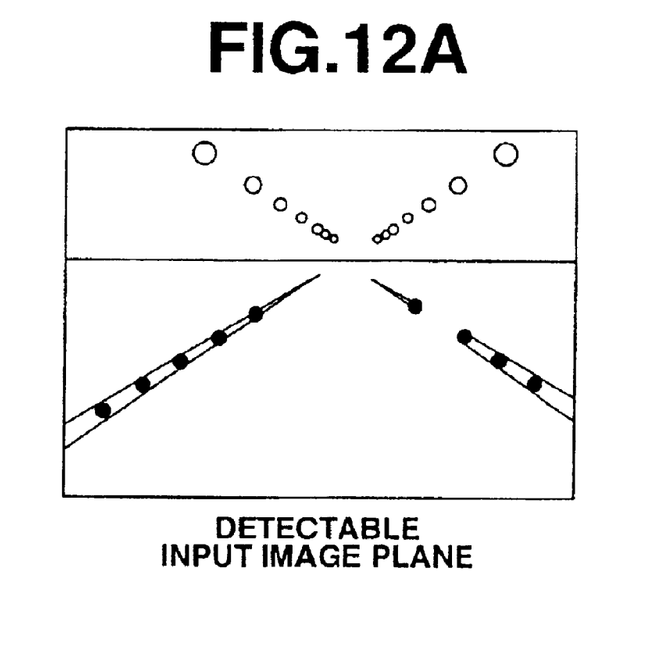
FIG. 12A is a view showing an example of a lane marker detectable image.
Figure 12B:
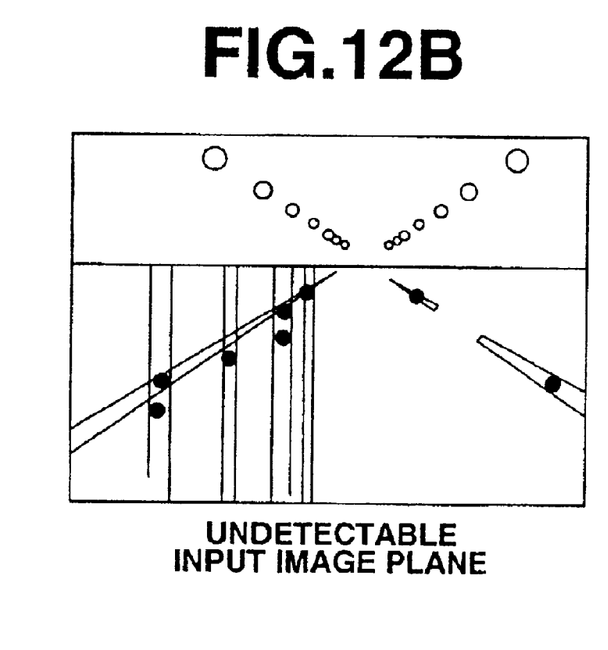
FIG. 12B is a view showing an example of a lane marker undetectable image.

At step S207, on the basis of the deviation p calculated at step S206, it is determined whether or not it is possible to detect the lane marker from the inputted image. That is, marker detection feasibility determining section 107 of processor 100 determines whether the road image can be employed for detecting the lane marker. When a condition that the value of the average deviation p obtained from Equation (12) is greater than or equal to a predetermined value, is continuously maintained for a predetermined time period, it is determined that it is not possible to detect the lane marker from the input image. Further, when filtered data, which is obtained by treating time-series data of the average deviation p using a low pass filter, is greater than a predetermined detectable threshold as shown in FIG. 11, it may be determined that it is impossible to detect the lane marker from the input image. FIGS. 12A and 12B show input images which is determined whether the lane marker is detected from the input images by using the method shown in FIG. 11. FIG. 12A shows an input image from which the lane marker can be detected, and FIG. 12B shows an input image from which the lane marker cannot be detected. That is, when a film of rainwater is formed on a road surface during raining at night, reflection of roadway lighting or water stayed in trails of vehicles is picked up like as a lane marker, and therefore the erroneous detection is executed as shown in FIG. 12B. In FIG. 12B, the reflection of roadway lighting is picked up as vertical lines in a left hand side image, and the water stayed in trails is picked up as a right hand side. Accordingly, FIG. 12B shows a condition that the detection result is erroneous, since these reflection and water are picked up like as a lane marker.

When it is determined at step S207 that it is not possible to detect the lane marker from the input image, the program returns to step S202 and repeats the above-discussed processing. When it is determined at step S207 that it is possible to detect the lane marker from the input image, the program proceeds to step S208.

At step S208, processor 100 calculates parameters for the road model from the positions of the lane marker candidate points on the screen obtained at step S205. At this time, processor 100 reads the road parameter stored in the storage device of road parameter calculating section 105. An extended Kalman filter may be used as means for estimating an equation for a two-dimensional road model based on a result of detection of a lane marker candidate point through image processing.

Equation (14) is derived from the above-described Equations (1) through (4). Equation (14) is used as an output equation in configuring the extended Kalman filter, and the value of an x-coordinate at a y-coordinate value defined on a plane under image processing is calculated from the road curvature and a state quantity of the vehicle.

$$x = \left(-\frac{y_c}{h} + i\frac{W}{h}\right)(y+f\eta) + \frac{f^2 h\rho}{2(y+f\eta)} - f\phi \qquad (14)$$

The estimated state quantity in the extended Kalman filter includes lateral displacement $y_c$ of the vehicle, road curvature $\rho$, vehicle yaw angle $\phi$ of the vehicle, pitch angle $\eta$ of the vehicle, and height h of CCD camera 101. Further, the focal length f of the lens and the lane width W are treated as constant values. A state equation expressed as Equation (15) shown below is obtained if it is defined as a random walk model in a discrete system which is driven by white Gaussian noises v on the assumption that a change of each estimated state quantity behaves stochastically.

$$\begin{bmatrix} y_c \\ \rho \\ \phi \\ \eta \\ h \end{bmatrix} = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix} \begin{bmatrix} y_c \\ \rho \\ \phi \\ \eta \\ h \end{bmatrix} + \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix} \begin{bmatrix} v_{yc} \\ v_\rho \\ v_\phi \\ v_\eta \\ v_h \end{bmatrix} \qquad (15)$$

When State Equation (15) and Output Equation (14) are simplified into Equations (16) and (17) shown below, the extended Kalman filter is configured by Equations (18) through (21).

$$x_s(k+1)=A_s x_s(k)+G_s v(k) \qquad (16)$$

$$x=g(x_s,Y) \qquad (17)$$

$$\hat{x}_s(k+1|k)=A_s\hat{x}_s(k|k-1)+K(k)\{x(x(k)-g(\hat{x}_s(k|k-1),y(k))\} \qquad (18)$$

$$K(k)=A_s P(k)C^T(CP(k)C^T+R)^{-1} \qquad (19)$$

$$P(k+1)=A_s M(k)A_s^T+G_s Q G_s^T \qquad (20)$$

$$M(k)=P(k)\{I-C^T(CP(k)C^T+R)^{-1}CP(k)\} \qquad (21)$$

where M(k) represents covariance of states which is determined by the process; P(k) represents covariance of later states obtained from observed values; K(k) represents the gain of the Kalman filter; Q represents covariance of observation noises; R represents covariance of process noises; I represents a unit matrix; k represents a lag; and $$C \cong \frac{\partial g(\hat{x}_s(k), y(k))}{\partial x_s}.$$

Although in the above embodiment the height h of CCD camera 101 is estimated on the basis of the premise that the width W of the lane is constant, it will be understood that the width of the lane W may be estimated on the basis of the premise that the height h of CCD camera 101 is constant. Further, although the first embodiment is arranged to calculate the road parameter by using the Kalman filter, the present invention is not limited to this embodiment and may be arranged to calculate the road parameter by using the other estimating method or identifying method such as the least square method.

Returning to FIG. 2, at step S209, processor 100 stores the new road parameter calculated at step S208 in the data storage region of the storage device of road model parameter calculating section 105. The stored road parameter is used in the next image processing including the setting of the lane marker detection areas, the calculator of the deviation, and the calculation of the new road parameter. Thereafter, the routine returns to step S203 wherein a new image for the next processing is picked up.

[Second Embodiment]

The Lane recognition apparatus 1 of a second embodiment comprises basic elements as shown in FIG. 1, as is similar to the first embodiment.

Figure 3:
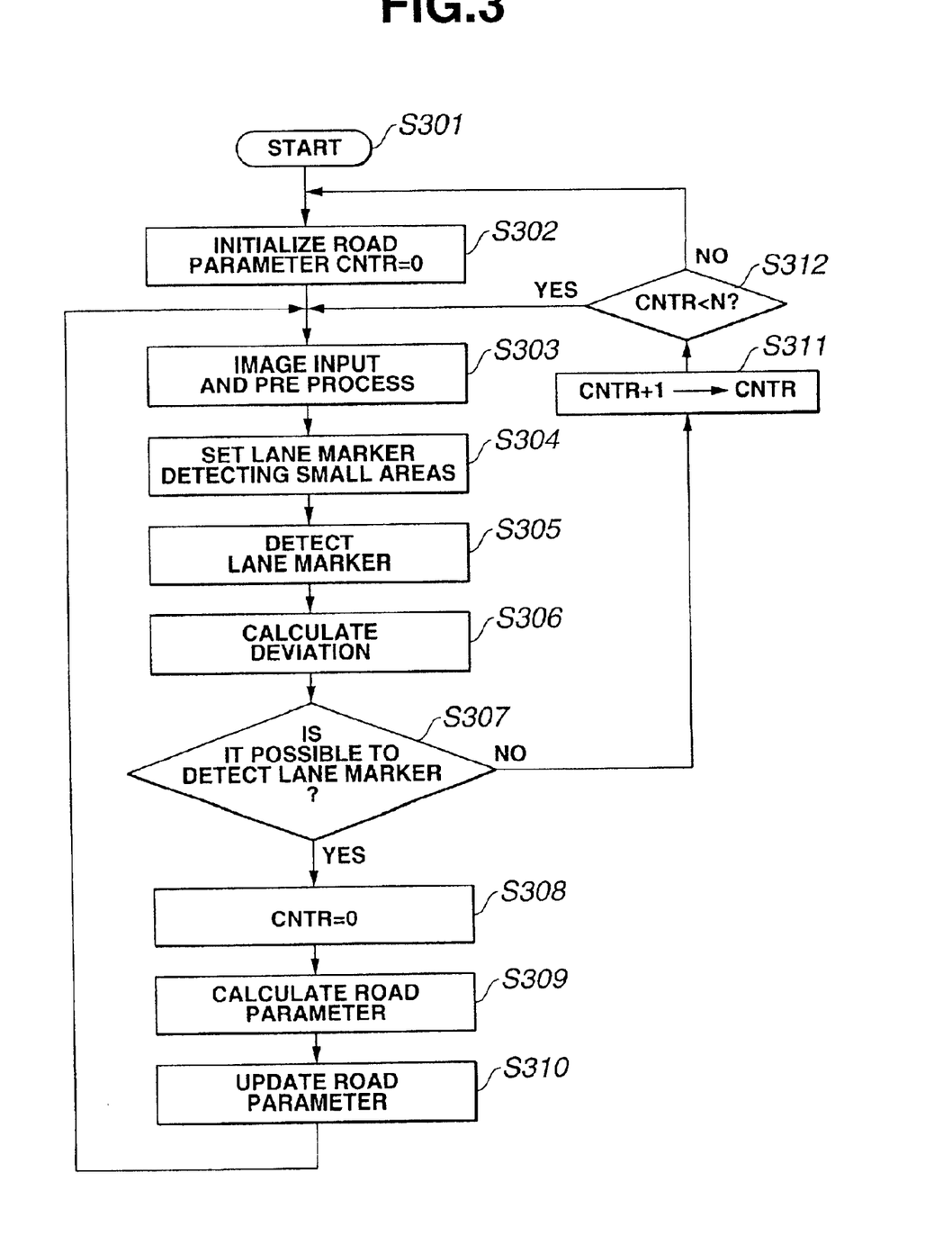
FIG. 3 is a flowchart showing a processing procedure of the lane recognition apparatus of a second embodiment.

FIG. 3 is a flow chart showing a flow of processes in the second embodiment according to the present invention. First, lane recognition apparatus 1 is started when a switch is operated by the driver or the vehicle is ignited at step S301. Next, at step S302 road parameters for recognizing the shape of a road ahead of the vehicle are initialized, and a content of a counter CNTR is reset (CNTR=0). The definition of the road parameter in the second embodiment is the same as that in the first embodiment.

Steps S303 through S307 correspond to steps S203 through S207 of the first embodiment. More specifically, at step S303 pre-processing section 102 of processor 100 receives the signal of the signal of the image picked up by CCD camera 101, and executes the pre-processing. At step S304 processor 100 sets the small areas in order to detect a lane marker which indicates the lane in which the vehicle is traveling on the screen. At step S305, processor 100 detects a straight line, which most likely seems to be a boundary between the lane marker and the road surface in the region in the small areas set in step S304, and determines the point on the straight line is determined as a lane marker candidate point. Further, at step S306 processor 100 calculates a deviation of the lane marker candidate point detected at step S305 relative to the road model estimated from the result of the previous lane marker recognition result. Furthermore, at step S307, processor 100 determines whether or not it is possible to detect the lane marker from the inputted image on the basis of the average deviation p calculated at step S306. That is, marker detection feasibility determining section 107 of processor 100 determines whether or not the road image can be employed for detecting the lane marker.

When it is determined at step S307 that it is possible to detect the lane marker from the inputted image, the routine proceeds to step S308 wherein the content of counter CNTR is set at zero (CNTR=0).

At step S309 following the execution of step S308, processor 100 calculates parameters of the road model from the position of the lane marker candidate points on the image obtained at step S305 as is similar to the processing of step S208 of the first embodiment. Further, at step S310, processor 100 updates the road parameter, that is, stores the new road parameter calculated at step S309 in the data storage region of the storage device of road model parameter calculating section 105 as is similar to the processing of step S209 of the first embodiment.

When the determination at step S307 is negative, that is, when it is determined that it is not possible to detect the lane marker from the inputted image, the program jumps to step S311 wherein the content of counter CNTR is incremented by 1 (CNTR+1→CNTR).

At step S312 following the execution of step S311, it is determined whether or not the content of counter CNTR is smaller than a predetermined value N. When the determination at step S312 is affirmative (CNTR<N), the program returns to step S303 wherein the next image processing is executed without updating the road parameter. When the determination at step S312 is negative (CNTR≧N), the program returns to step S302 wherein the initialization of the road parameter and the reset of counter CNTR are executed again.

[Third Embodiment]

The lane recognition apparatus 1 of a third embodiment comprises basic elements as shown in FIG. 1, as is similar to the first embodiment.

Figure 4:
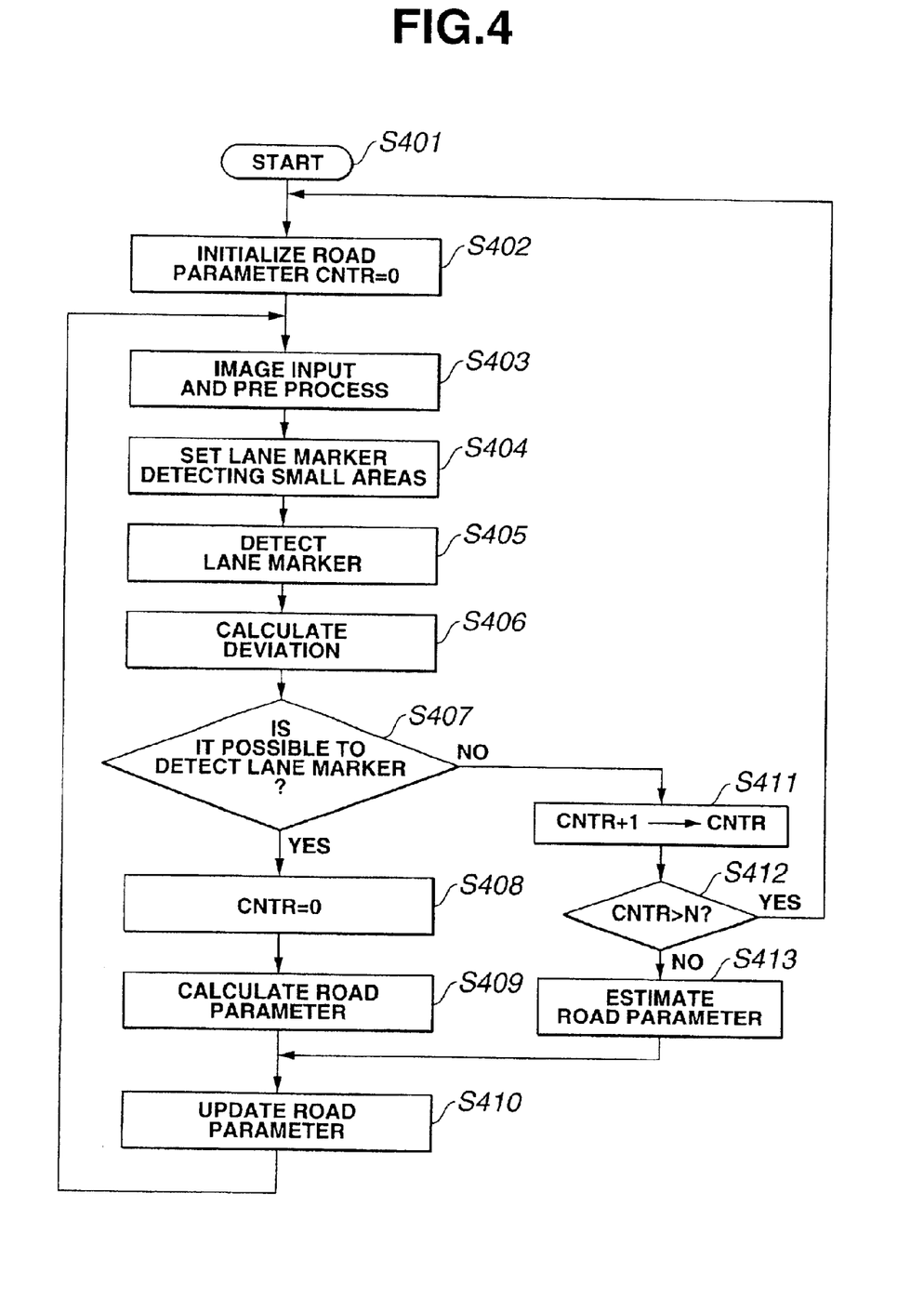
FIG. 4 is a flowchart showing a processing procedure of the lane recognition apparatus of a third embodiment.

FIG. 4 is a flowchart showing a flow of processes in the third embodiment according to the present invention. First, lane recognition apparatus 1 is started when a switch is operated by the driver or the vehicle is ignited at step S401. Next, at step S402 road parameters for recognizing the shape of a road ahead of the vehicle are initialized, and a content of a counter CNTR is reset (CNTR=0). The definition of the road parameter in the third embodiment is the same as that in the first embodiment.

Steps S403 through S407 are basically similar to steps S203 through S207 of the first embodiment. More specifically, at step S403 pre-processing section 102 of processor 100 receives the signal of the signal of the image picked up by CCD camera 101, and executes the pre-processing is executed. At step S404, processor 100 sets the small areas in order to detect a lane marker which indicates the lane in which the vehicle is traveling on the screen. At step S405, processor 100 detects a straight line, which most likely seems to be a boundary between the lane marker and the road surface in the region in the small areas set in step S404, and determines the point on the straight line is determined as a lane marker candidate point. Further, at step S406 processor 100 calculates a deviation of the lane marker candidate point detected at step S405 relative to the road model estimated from the result of the previous lane marker recognition result. Furthermore, at step S407, processor 100 determines whether or not it is possible to detect the lane marker from the inputted image on the basis of the deviation p calculated at step S406.

When it is determined at step S407 that it is possible to detect the lane marker from the inputted image, the routine proceeds to step S408 wherein the content of counter CNTR is set at zero (CNTR=0).

At step S409 following the execution of step S408, processor 100 calculates parameters of the road model from the position of the lane marker candidate points on the image as is similar to the processing of step S208 of the first embodiment. Further, at step S410, processor 100 stores the new road parameter calculated at step S409 in the data storage region of the storage device of road model parameter calculating section 105 as is similar to the processing of step S209 of the first embodiment.

When the determination at step S407 is negative, that is, when it is determined that it is not possible to detect the lane marker from the inputted image, the program jumps to step S411 wherein the content of counter CNTR is incremented by 1 (CNTR+1→CNTR).

At step S412, it is determined whether or not the content of counter CNTR is greater than a predetermined value N. When the determination at step S412 is affirmative (CNTR>N), the program proceeds to step S413 wherein the road parameter is estimated using a sequential-type estimator such as the Kalman filter and on the basis of the changing state of the road parameter until the previous processing without using the present parameter candidate point. When the determination at step S412 is negative (CNTR≦N), the program returns to step S402 wherein the initialization of the road parameter and the reset of counter CNTR are executed again.

With the thus arranged embodiments according to the present invention, it becomes possible to eliminate wrong recognition caused by the incorrect detection of the lane marker candidate points. Further, it becomes possible to improve the reliability of the lane marker detection result to the diagnosis of the wrong recognition. Furthermore, it is possible to convert the offset quantity of the pixels of the image into the offset quantity on the road surface. The embodiments according to the present invention is arranged such that when the image is determined that it is not proper to employ for detecting the lane marker, the detection result of the lane marker candidate points obtained from the improper image are not used to calculate the road model parameter. Accordingly, this arrangement prevents the road shape of the road ahead of the host vehicle from being incorrectly detected.

This application is based on a prior Japanese Patent Application No. 2000-397747. The entire contents of a Japanese Patent Application No. 2000-397747 with a filing date of Dec. 27, 2000 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A lane recognition apparatus for a vehicle, comprising:
   an image picking-up section picking up a road image ahead of the vehicle;
   a lane-marker detecting section detecting a plurality of lane-marker candidate points on the road image;
   a road model parameter calculating section calculating a road model parameter representative of a road shape ahead of the vehicle on the basis of the lane-marker candidate points;
   a deviation calculating section calculating a deviation between the lane marker candidate point and an estimated candidate point estimated from the road model parameter; and
   a lane marker detection feasibility determining section determining whether the road image is employed for detecting the lane marker, on the basis of the deviation.

2. The lane recognition apparatus as claimed in claim 1, wherein the lane-marker detecting section detects the lane-marker candidate points in the form of coordinate values on a plane coordinate system of the image plane, and the road parameter calculating section calculating the road parameter on the basis of the coordinate values of the lane-marker candidate points.

3. The lane recognition apparatus as claimed in claim 1, wherein the deviation calculating section calculates an absolute value of a difference between the lane marker candidate point and the estimated candidate point which have the same distance from the vehicle on the road image, and outputs an average of all absolute values of the differences between the lane marker candidate points and the estimated candidate points as the deviation.

4. The Lane recognition apparatus as claimed in claim 1, wherein the deviation calculating section calculates a square value of a difference between the lane marker candidate point and the estimated candidate point which have the same distance from the vehicle on the road image, and outputs an average of all square values of the differences between the lane marker candidate points and the estimated candidate points as the deviation.

5. The Lane recognition apparatus as claimed in claim 1, further comprising a pre-processing section which processes the road image picked up by the image picking-up section, the pre-processing section executes a differentiation process of the road image, and the deviation calculating section weights a differentiation density of the lane marker candidate point to the deviation when the deviation between the lane marker candidate point and the estimated candidate point is calculated.

6. The lane recognition apparatus as claimed in claim 1, wherein the deviation calculating section weights the deviation according to a distance from the vehicle to the lane marker candidate point on the road when the deviation between the lane marker candidate point and the estimated candidate point is calculated.

7. The lane recognition apparatus as claimed in claim 1, wherein the road parameter calculating section initializes the road model parameter when it is determined that the road image is not employed for detecting the lane marker.

8. The lane recognition apparatus as claimed in claim 1, wherein the road parameter calculating section uses the previous value of the road model parameter without initializing the road model parameter when it is determined that the road image is not employed for detecting the lane marker.

9. The lane recognition apparatus as claimed in claim 1, wherein the road parameter calculating section calculates the road model parameter without employing information as to the lane marker candidate point when it is determined that the road image is not employed for detecting the lane marker.

10. A lane recognition apparatus for a vehicle, comprising:
    image picking-up means for picking up a road image ahead of the vehicle;
    lane-marker candidate-point detecting means for detecting a plurality of lane marker candidate points from the road image;
    road model parameter calculating means for calculating a road model parameter representative of a road shape ahead of the vehicle on the basis of the lane marker candidate points;
    deviation calculating means for calculating a deviation between the lane marker candidate point and an estimated candidate point estimated from the road model parameter; and
    lane marker detection feasibility determining means for determining whether the road image is employed for detecting the lane marker, on the basis of the deviation.

11. A method for recognizing a lane ahead of a vehicle, comprising:
    picking up a road image ahead of the vehicle;
    detecting coordinate values of a plurality of lane marker candidate points from the road image;
    calculating a road model parameter representative of a road shape ahead of the vehicle on the basis of the coordinate values of the lane marker candidate points;
    calculating a deviation between the lane marker candidate point and an estimated candidate point estimated from the road model parameter; and determining whether the road image is employed for detecting the lane marker, on the basis of the detecting deviation.

12. A lane recognition apparatus for a vehicle, comprising:
   a camera installed to the vehicle, the camera picking up a road image ahead of the vehicle; and
   a processor coupled to the camera, the processor being arranged
   to detect a plurality of lane marker candidate points from the road image;
   to calculate a road model parameter representative of a road shape ahead of the vehicle on the basis of the lane marker candidate points;
   to calculate a deviation between the lane marker candidate point and an estimated candidate point estimated from the road model parameter; and
   to determine whether the road image is employed for detecting the lane marker, on the basis of the deviation.

* * * * *